(12) United States Patent
Wagner

(10) Patent No.: US 8,284,455 B2
(45) Date of Patent: Oct. 9, 2012

(54) VISUAL UNIFORMITY ADJUSTMENT PROCEDURE USING AREAS OF DIFFERENT SCREEN GEOMETRIES AND FREQUENCIES

(75) Inventor: Moritz Patrick Wagner, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 680 days.

(21) Appl. No.: 12/546,077

(22) Filed: Aug. 24, 2009

(65) Prior Publication Data
US 2011/0043865 A1 Feb. 24, 2011

(51) Int. Cl.
G06T 5/00 (2006.01)
H04N 1/405 (2006.01)
G06K 15/00 (2006.01)
(52) U.S. Cl. .................. 358/3.27; 358/3.1; 358/3.06
(58) Field of Classification Search .................. None
See application file for complete search history.

(56) References Cited

U.S. PATENT DOCUMENTS

| 5,278,589 | A | 1/1994 | Wong |
| 5,365,074 | A | 11/1994 | Genovese |
| 6,904,255 | B2 | 6/2005 | Kera et al. |
| 7,177,585 | B2 | 2/2007 | Matsuzaka et al. |
| 7,729,015 | B2 * | 6/2010 | Mizes et al. .................. 358/3.1 |

* cited by examiner

*Primary Examiner* — Twyler Haskins
*Assistant Examiner* — Barbara Reinier
(74) *Attorney, Agent, or Firm* — Pillsbury Winthrop Shaw Pittman, LLP

(57) ABSTRACT

A method for correcting at least one uniformity error selected from the group consisting of a process direction uniformity error and a cross-process direction uniformity error in an image printing system that prints on an image bearing surface movable in a process direction. The method includes printing on a media a test pattern that includes a plurality of segmented regions extending in the direction of the at least one uniformity error being corrected, receiving a correction data from the user, and adjusting a profile of the image printing system to correct for the at least one uniformity error based on the received correction data Each segmented region comprising a coarse halftone area and a fine halftone area adjacent one another. The resolution of the fine halftone area is at least about 1.5 times the resolution of the coarse halftone area.

26 Claims, 8 Drawing Sheets

VISUAL UNIFORMITY ADJUSTMENT PROCEDURE USING AREAS OF DIFFERENT SCREEN GEOMETRIES AND FREQUENCIES

BACKGROUND

1. Field

The present disclosure relates to a method and a system for correcting at least one uniformity error selected from the group consisting of a process direction uniformity error and a cross-process direction uniformity error in an image printing system that prints on an image bearing surface movable in a process direction.

2. Description of Related Art

A cross-process direction uniformity in an image printing system may be affected by one or more subsystems in the image printing system. For example, these subsystems may include a charge subsystem, an imaging subsystem, a development subsystem, a transfer subsystem, and a fusing subsystem. Instead of making all these subsystems in the image printing system very uniform over the width of the process it is generally more effective to correct for temporally stable non-uniformities by adjusting the power of the laser used to form a latent image on the image transfer photoreceptor belt or drum. The prints can be made darker where needed by locally boosting the laser power. In other words, for the image printing systems that do not create a uniform-within-page image, the laser power across the image may be adjusted to generate a more uniform image. For direct imaging systems (e.g., an inkjet or a liquid wax printing system), the dot size may be locally adjusted by changing adjustable parameters for each individual nozzle. For example, an adjustable parameter for the individual nozzle may include heating current. Alternatively, the adjustment may also be made by changing the halftone level locally in the digital front end.

In high end image printing systems, these adjustments are done by measuring the cross-process direction density profile of a halftone print. The measured profile is then automatically downloaded into an imaging controller. For the lower end entry production image printing systems, these adjustments are done manually by visually evaluating a print and adjusting the laser intensity every 2 to 3 inches across the process. In other words, there is no measurement system in the lower end entry production image printing systems that is available to measure the non-uniformity. It is generally very difficult to assess low frequency color changes with this current manual procedure where a diagnostic print with full width halftone color strips is used.

SUMMARY

According to one aspect of the present disclosure, a method for correcting at least one uniformity error selected from the group consisting of a process direction uniformity error and a cross-process direction uniformity error in an image printing system that prints on an image bearing surface movable in a process direction. The method includes printing on a media a test pattern that includes a plurality of segmented regions extending in the direction of the at least one uniformity error being corrected, receiving correction data from the user, and adjusting a profile of the image printing system to correct for the at least one uniformity error based on the received correction data. Each segmented region corresponds to a position on the image bearing surface of the image printing system, and each segmented region includes a coarse halftone area and a fine halftone area adjacent one another. The resolution of the fine halftone area is at least about 1.5 times the resolution of the coarse halftone area. The correction data is based on a visual comparison between the coarse halftone area and the fine halftone area in each segmented area.

According to another aspect of the present disclosure, a system for correcting at least one uniformity error selected from the group consisting of a process direction uniformity error and a cross-process direction uniformity error in an image printing system that prints on an image bearing surface movable in a process direction. The system includes a print engine and a controller. The print engine is configured to print on a media a test pattern comprising a plurality of segmented regions extending in the direction of the at least one uniformity error being corrected. Each segmented region corresponds to a position on the image bearing surface of the image printing system, and each segmented region comprising a coarse halftone area and a fine halftone area adjacent one another. The resolution of the fine halftone area is at least about 1.5 times the resolution of the coarse halftone area. The controller is configured (a) to receive correction data from the user 220, wherein the correction data is based on a visual comparison between the coarse halftone area and the fine halftone area in each segmented area, and (b) to adjust a profile of the image printing system to correct for the at least one uniformity error based on the received correction data.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments of the present disclosure will now be disclosed, by way of example only, with reference to the accompanying schematic drawings in which corresponding reference symbols indicate corresponding parts, in which.

DETAILED DESCRIPTION

The present disclosure proposes to provide a reference patch at each adjustment position (i.e., a position on a diagnostic print that corresponds to a position on the image bearing surface of the image printing system) by printing a halftone strip right next to a line screen strip, where the line screen strip is more stable than the halftone strip with respect to small xerographic changes, thus providing the correct reference color. The same process may also be used for both process direction and cross-process direction uniformity assessment and subsequent adjustment.

Figure 1:
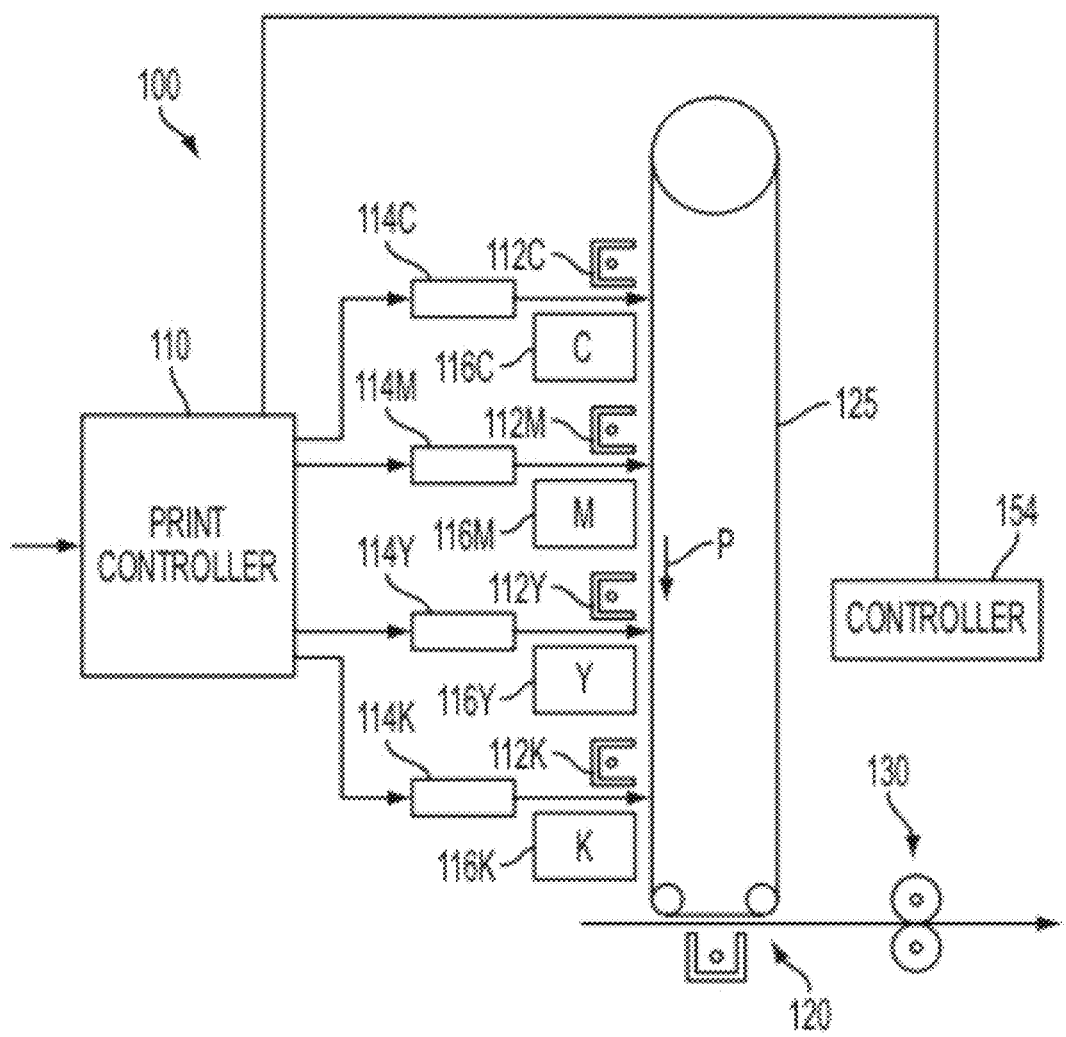
FIG. 1 illustrates a simplified front view of basic elements of an image printing system, showing a context of the various embodiments.

FIG. 1 is a simplified front view of basic elements of an image printing system 100, showing a context of the present disclosure. Specifically, there is shown an "image-on-image" xerographic color printer, in which successive primary-color images are accumulated on an image bearing surface 125 (e.g., photoreceptor belt), and the accumulated superimposed images are in one step directly transferred to an output sheet as a full-color image. In one implementation, the Xerox® iGen3® digital printing press may be utilized. However, it is appreciated that any image printing system, such as monochrome machines using any technology, machines which print on photosensitive substrates, xerographic machines with multiple photoreceptors, or ink-jet-based machines, can beneficially utilize the present disclosure as well.

Specifically, the FIG. 1 embodiment includes the image bearing surface 125 (e.g., photoreceptor belt), along which are disposed a series of stations, as is generally familiar in the art of xerography, one set for each primary color to be printed. For instance, to place a cyan color separation image on the image bearing surface 125, there is used a charge device 112C, an imaging system 114C, and a development unit 116C. For successive color separations, there is provided equivalent elements 112M, 114M, 116M (for magenta), 112Y, 114Y, 116Y (for yellow), and 112K, 114K, 116K (for black). The colors shown here may vary. In other words, the colors different from ones shown here may be used. In one embodiment, fewer or more colors than ones shown here may be used. The successive color separations are built up in a superimposed manner on the surface of the image bearing surface 125, and then the combined full-color image is transferred at transfer station 120 to an output sheet. The output sheet is then run through a fuser 130, as is familiar in xerography. Printing process may be controlled, for example, by a print controller 110.

As is familiar in the art of "laser printing," by coordinating the modulation of the various lasers with the motion of the image bearing surface 125 and other hardware (such as rotating mirrors, etc., not shown), the light discharge areas on the image bearing surface 125 to create latent images to be developed by their respective development units 116C, 116M, 116Y, 116K.

The image printing system 100 may include a controller 154 that may be configured for taking an action in response to critical measurements input by a user 220 as will be explained in detail with respect to FIG. 2. The information gathered therefrom is used by the controller 154 and/or the print controller 110 in various ways to aid in the operation of the image printing system 100, for example for correcting at least one uniformity error selected from the group consisting of a process direction uniformity error and a cross-process direction uniformity error in the image printing system 100. While the control device 154 and the print controller 110 are shown in the figure as being separate elements, it will be appreciated that in some implementations, the controller 154 may be a part of the print controller 110.

The image printing system 100 generally may include two important dimensions: a process (or slow scan) direction and a cross-process (or fast scan) direction. The direction in which the image bearing surface 125 moves is referred to as the process (or slow scan) direction, and the direction that is transverse or perpendicular to the process direction is referred to as the cross-process (or fast scan) direction.

In one embodiment, the image bearing surface 125 of the image printing system 100 is selected from the group consisting of a photoreceptor drum, a photoreceptor belt, an intermediate transfer belt, and an intermediate transfer drum. That is, the term image bearing surface means any surface on which a toner image is received, and this may be an intermediate surface (i.e., a drum or belt on which a toner image is formed prior to transfer to the printed document). For example, a "tandem" xerographic color printing systems (e.g., U.S. Pat. Nos. 5,278,589; 5,365,074; 6,904,255 and 7,177,585, each of which are incorporated by reference), typically include plural print engines transferring respective colors sequentially to an intermediate image transfer surface (e.g., belt or drum) and then to the final substrate.

The present disclosure proposes using a segmented diagnostic print for a uniformity adjustment in a cross-process direction, in a process direction, or both. The segmented diagnostic print includes alternating coarse halftone patterns (e.g., line screens shown in FIG. 4 and checkered board pattern shown in FIG. 5) and fine halftone patterns shown in FIGS. 3, 4 and 5. The terms coarse and fine are used relative to one another. In other words, the present disclosure proposes to print pairs of strips: one strip is at the halftone frequency at which a uniform image is required, and the other strip is a coarser halftone pattern. The coarse halftone pattern is less sensitive to small xerographic disturbances than the fine halftone pattern. Thus, the coarse halftone pattern will have a smaller non-uniformity than the fine halftone pattern. This enables a visual assessment of the sign of actuator adjustments across the process direction or the cross-process direction. In other words, for the image printing system, if the fine halftone pattern is lighter than the coarse halftone or line screen, larger dots may be placed in fine halftone pattern. This may be achieved by increasing the laser power locally or by printing a slightly darker halftone in the fine halftone segment of the print. As noted above, for direct imaging technologies (i.e., an ink-jet or a liquid wax printing system), a process parameter may be adjusted locally or as in the case above the halftone level may be changed locally in the digital front end. The segmented diagnostic print will provide a user 220, who is evaluating the cross-process direction print uniformity or process direction print uniformity, with a reference color for each segment. The user 220 may then easily input the necessary corrections into a controller of an image printing system, for example, using a user interface. The necessary corrections may include instructions, for example, to make segment 3 darker and segment 1 lighter. The controller of the image printing system then corrects the laser power profile according to those inputs from the user 220 and the user 220 may iteratively find the best corrections until he/she is satisfied with the print uniformity. With such iterations, a more uniform profile of the fine halftone pattern may be achieved without a machine-based quantitative measurement. The present disclosure thus uses the insensitivity of coarse halftone patterns to subsystem variations for correcting at least one uniformity error selected from the group consisting of a process direction uniformity error and a cross-process direction uniformity error in the image printing system.

According to an embodiment of the present disclosure, a reference point is periodically placed at different locations in the process and the cross-process directions. The reference point is placed by using a coarser halftone pattern and a fine halftone pattern, which are placed adjacent to each other. Later, the coarser halftone pattern is directly compared with the fine halftone pattern by the user. If, for example, the fine halftone pattern is lighter or darker than the corresponding coarser halftone pattern, then a correction is needed in that area. The correction may include increasing the power to the Raster Output Scanner (ROS) when the fine halftone pattern is lighter than the coarser halftone pattern, and decreasing the power to the Raster Output Scanner (ROS) when the fine halftone pattern is darker than the coarser halftone pattern. As mentioned above, this adjustment may be different for different printing technologies, but the methodology remains the same. The adjustment may also be made in the digital front end by locally changing halftones which is independent of the printing technology.

Figure 2:
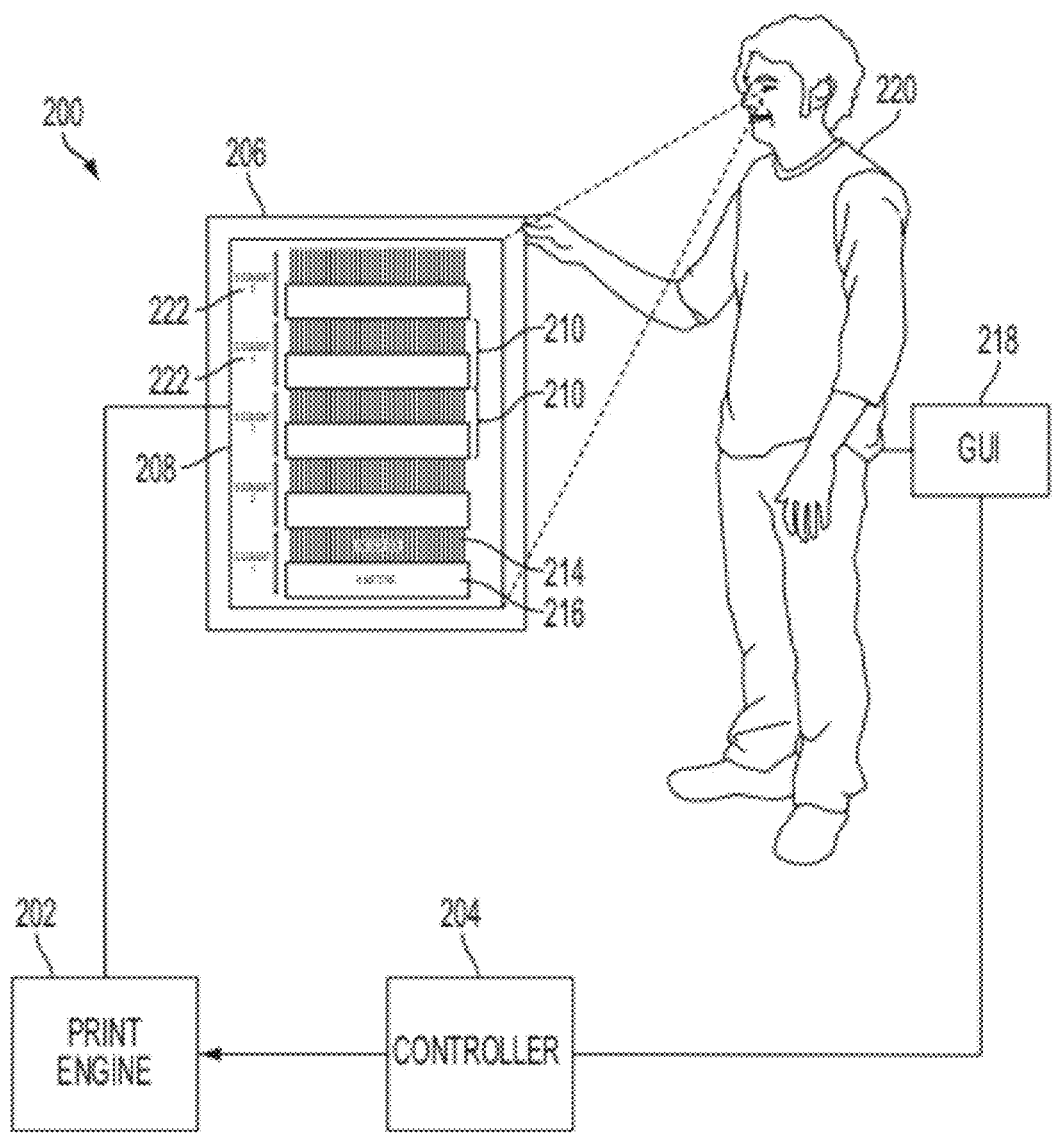
FIG. 2 illustrates a system for correcting at least one uniformity error selected from the group consisting of a process direction uniformity error and a cross-process direction uniformity error in the image printing system in accordance with an embodiment.

FIG. 2 illustrates a system 200 for correcting at least one uniformity error selected from the group consisting of a process direction uniformity error and a cross-process direction uniformity error in the image printing system 100 in accordance with an embodiment of the present disclosure. The system 200 includes a print engine 202 and a controller 204. The print engine 202 is configured to print on a media 206 a test pattern 208 that includes a plurality of segmented regions 210 extending in the direction of the at least one uniformity error being corrected. Each segmented region 210 corresponding to a position on the image bearing surface 125 of the image printing system 100. Each segmented region 210 includes a coarse halftone area 214 and a fine halftone area 216 adjacent one another. For best results, the resolution of the fine halftone area 216 is about 1.5 to 2 times the resolution of the coarse halftone area 214, but the methodology may work with smaller ratios depending on the severity of the defects. The controller 204 is configured (a) to receive correction data from the user 220, and (b) to adjust a profile of the image printing system 100 to correct for the at least one uniformity error based on the received correction data. The correction data is input by the user and based on a visual comparison between the coarse halftone area 214 and the fine halftone area 216 in each segmented area 210.

The test pattern 208 may include indicia 222 that correspond to the segmented regions 210. The system 200 may include a user interface 218 that is configured to receive the correction data from the user 220. The user interface 218 may include a graphical user interface. The graphical user interface 218 is configured to receive the correction data corresponding to each of the indicia 222.

The graphical user interface 218 may be a display device attached to the image printing system 100. This display device may include a cathode ray tube (CRT), a liquid crystal display (LCD), a plasma, or other display device. Alternatively, the graphical user interface 218 may be computer associated with the image printing system 100.

The necessary corrections may be input into the controller 204 through the graphical user interface 218. The graphical user interface 218 may include a format that is similar to the format of a graphic equalizer. The graphical user interface 218 may include a slider controls for each segmented region 210 of the test pattern 208.

Figure 3:
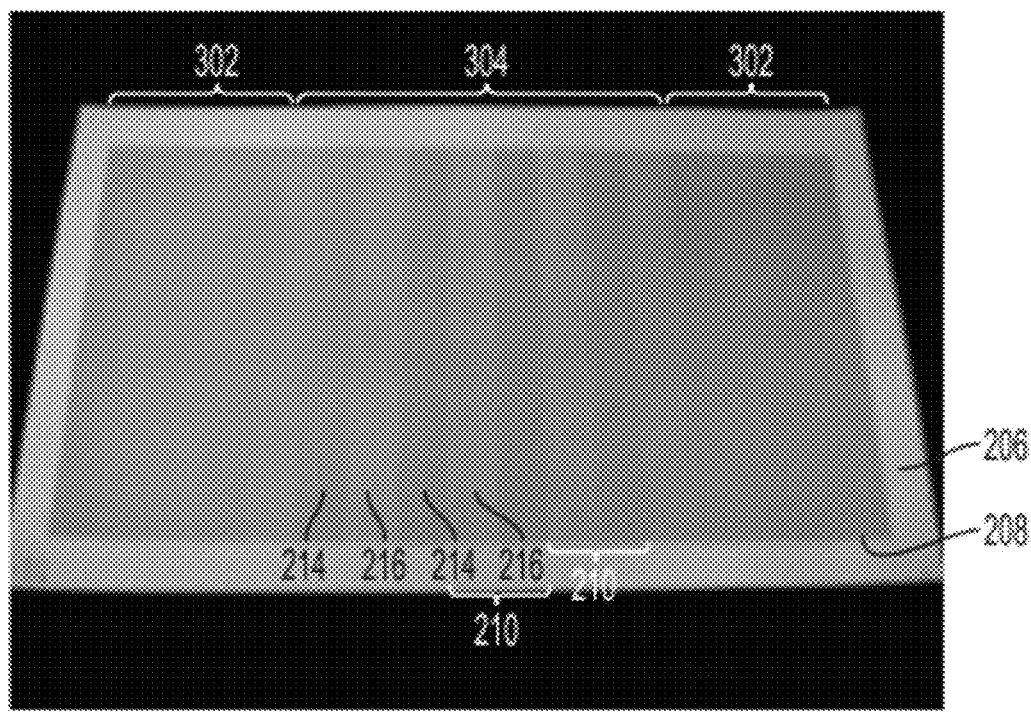
FIG. 3 illustrates an exemplary test pattern includes a plurality of segmented regions, wherein each segmented region includes a coarse halftone area and a fine halftone area adjacent to one another in accordance with an embodiment.
Figure 4:
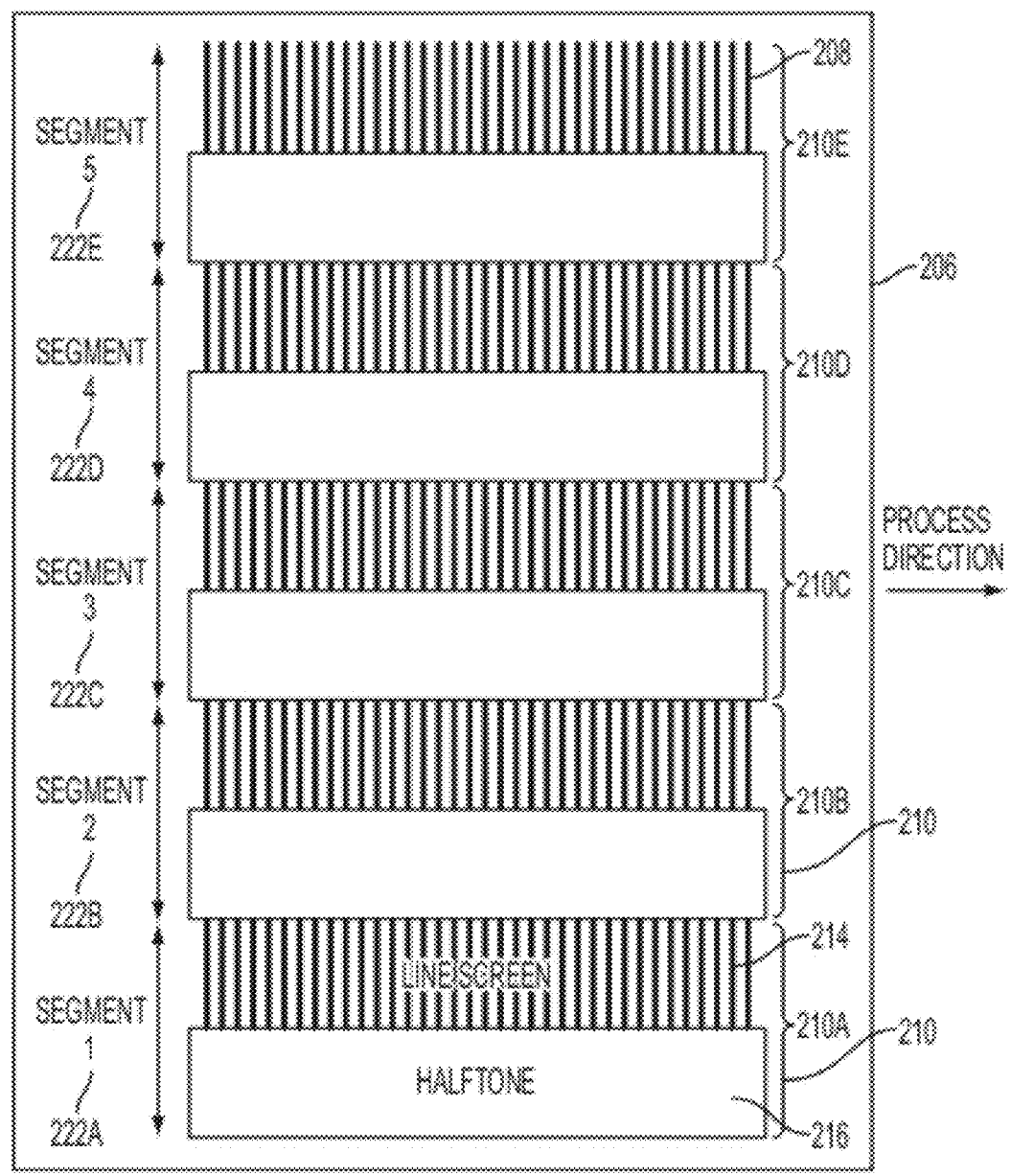
FIG. 4 illustrates an exemplary test pattern that includes a coarse "line screen" halftone area and a fine halftone area adjacent to one another in accordance with an embodiment.

FIGS. 3 and 4 illustrate the media 206 on which the test pattern 208 is printed. The test pattern 208 includes the plurality of segmented regions 210 extending in the direction of the at least one uniformity error being corrected.

Referring to FIG. 3, in end sections 302 of the test pattern 208, the difference between the coarser halftone areas 214 and the fine halftone areas 216 are very difficult to visually perceive. In contrast, in central section 304 of the test pattern 208, the coarser halftone areas 214 are darker and the fine halftone areas 216 are lighter. This is mainly because the coarser halftone areas 214 are less sensitive to the xerographic changes than the fine halftones, and therefore, the coarser halftone areas 214 do not have a non-uniformity that can be visually perceived. In general, for large areas, a human eye can perceive the difference between the coarser halftone areas 214 and the fine halftone areas 216 if the variability of uniformity is more than 1 delta-E units, for example, between 1 and 2 delta-E units. In other words, if the variability of uniformity is less than 1 delta-E unit, then the difference between the coarser halftone areas 214 and the fine halftone areas 216 cannot be perceived by a normal human eye.

As shown in FIGS. 3 and 4, the plurality of segmented regions 210 may be placed periodically on the test pattern 208. The test pattern 208 may generally include eight to sixteen segmented regions. In one embodiment, the plurality of segmented regions 210 may include eight to twelve segmented regions placed, for example, on a 8½×11 inch letter paper. In another embodiment, the plurality of segmented regions 210 may include eight to sixteen segmented regions placed, for example, on a 8½×14 inch legal paper. However, the number of segmented regions 210 that are generally placed on the test pattern 208 can vary in number. The number of segmented regions 210 that may be placed on the test pattern 208 may in general be a compromise between an effort of the user 220 (i.e., to visually evaluate the test pattern 208) and the benefit provided by having a certain number of segmented regions 210 in the test pattern 208. In one embodiment, the test pattern 208 may generally include 0.5 to 1 segmented regions per inch of process width or length. In one embodiment, the width of the segmented regions may generally be about 1 to 2 inches.

In the illustrated embodiment, as shown in FIG. 3, the coarse halftone area 214 may include line screens. The line screens may include vertical line screens, horizontal line screens, or both. Generally, a line screen provides a measure of number of halftone lines that can be printed in a linear inch, where the value of the line screen may be expressed as Lines Per Inch (LPI). In other embodiment, instead of using line screen patterns, an array of other print elements, such as dots, dashes, line segments, or other elemental shapes, may be arranged to form a coarser halftone area. For example, in the illustrated embodiment as shown in FIG. 4, the coarse halftone area 214 may include a checkerboard pattern.

The resolution of the fine halftone area 216 is about 1.5 to 2 times the resolution of the coarse halftone area 214. The segmented region 210 may include a lower screen halftone. The lower screen halftone may include an area comprising 150 dots per inch that is placed next to an area comprising 225 dots per inch to 300 dots per inch, where the area comprising 150 dots per inch is used as the coarse halftone area 214.

The density of the halftone may be adjusted to match the resolution of the user interface that is being used. For horizontal (cross process) lines, the density of the halftone may be matched by changing the number of ON/OFF lines, for example, a one ON/one OFF pattern, or a two ON/three OFF. That is, for example, in case of a one ON/one OFF pattern, the laser of the ROS may be ON for one line and is OFF for one line in the fast scan direction. In general, the density of the one ON/one OFF pattern may not provide a 50% area coverage (even though it theoretically is at 50% area coverage) mainly because of the line growth during the xerographic process (i.e., these lines get larger and the gap between the lines gets smaller). Therefore, the density of the one ON/one OFF pattern may be more than 50% area coverage. In order to provide a good correction for this line growth, a two ON/three OFF pattern may be used. Also, horizontal lines are insensitive to fast scan spot-size variability. Depending on the resolution of the image path, for example, vertical lines may be adjusted by $1/8^{th}$ of a pixel to match the desired halftone density. That is, the laser of ROS may be ON for $7/8^{th}$ of the pixel and is OFF for 1 and $1/8^{th}$ of a pixel to correct for the line width growth. In the case of the lower screen halftone (i.e., coarse halftone pattern) discussed above, for example, the halftone level of the fine halftone pattern may need to be adjusted to match the visual density of the coarse halftone pattern.

The profile of the image printing system that is adjusted to correct for the at least one uniformity error may include a laser power profile of a raster output scanner (ROS). In one embodiment, adjusting the laser profile may include adjusting, for example, the density profile or toner area coverage profile. These adjustments may be done either by: (i) ROS exposure, where the laser power is increased or decreased in the desired area (e.g., an identified segmented region) by a certain amount, or (ii) digitally modifying the input image data content. The step of digitally modifying the input image data content may include calibrating tone reproduction curves (TRCs) based on readings from an Electrostatic Voltmeters (ESV) or a reflective Toner Area Coverage (TAC) sensor, and applying newly defined spatially varying TRC curve to images as they are printed. In an embodiment, after the TRCs are calibrated, an intended (desired) area coverage output level (reflectance), is identified by a controller for a current pixel of interest (POI). The coordinate (e.g., the y-coordinate), which represents the dimension capable of being corrected, of the position (x,y) of the current POI is used as a key for identifying one of the TRC identifiers (e.g., within a look-up table). An area coverage input level is determined by the controller as a function of an TRC identifier and a correctable dimension of the position of the current POI. The area coverage input level is transmitted to one or more of marking engines and is rendered on an output medium, such as image bearing surfaces.

Figure 5:
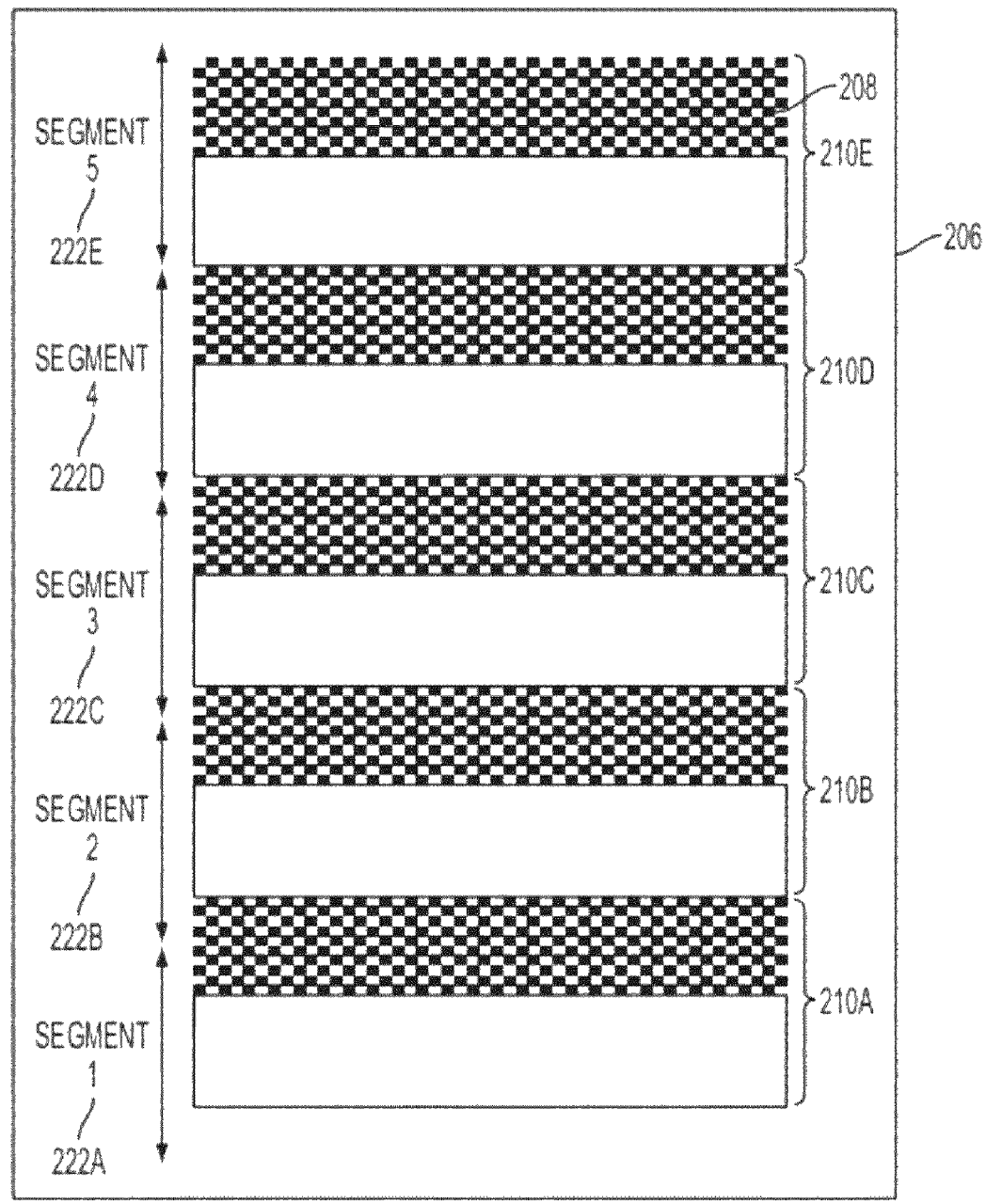
FIG. 5 illustrates an exemplary test pattern that includes a coarse "checkered board" halftone area and a fine halftone area adjacent to one another in accordance with another embodiment.

In one embodiment, as shown in FIGS. 4 and 5, the test pattern 208 may include indicia 222 corresponding to the segmented regions 210. These indicia 222A-222E may be printed next to the corresponding segmented regions 210A-E on the test pattern 208. The indicia 222A-222E may be textual, such as alphanumeric characters shown (segment 1, etc.) or graphical. These indicia 222 are configured to enable the user 220 to identify the segmented region for which the correction is needed and to input the correction data corresponding to the identified segmented region.

Figure 8:
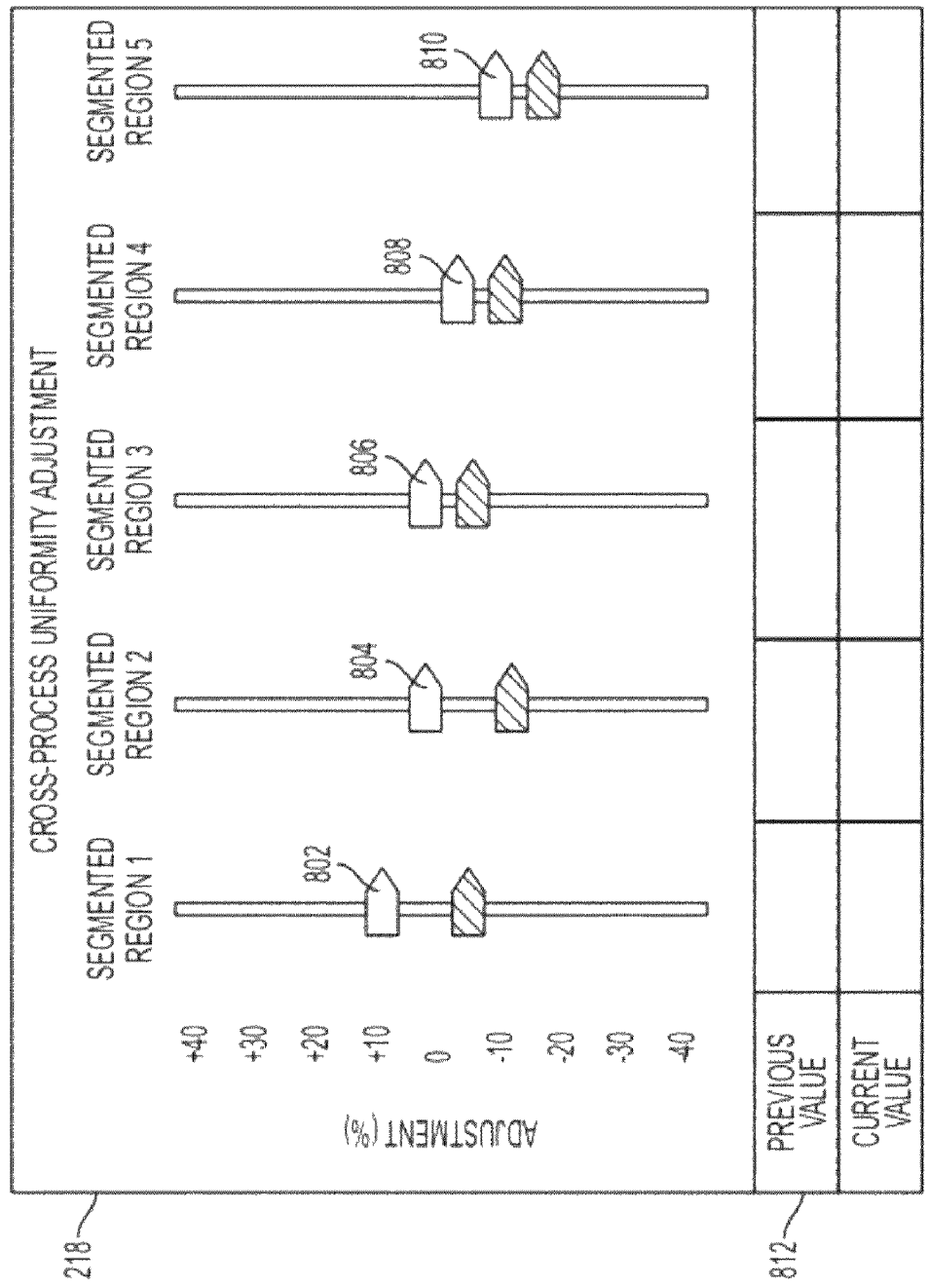
FIG. 8 illustrates an exemplary slider control for each segmented region for adjusting a profile to correct uniformity errors in the image printing system in accordance with an embodiment.

FIG. 8 shows an exemplary slider controls 800 for adjusting uniformity profile for each segmented region 210 in accordance with an embodiment. The adjustments to a laser power profile of the raster output scanner are initiated by first selecting the desired segmented region 210 in an adjustment table 812 that is displayed in the user interface 218. After selecting the desired segmented region 210, color keyed box highlights the present correction profile value for the segmented region 210 under adjustment. In one embodiment, all parameters that should not be adjusted as a part of the manual uniformity correction for the segmented region 210 are "locked" and "grayed out" to prevent unintended adjustment.

The density profile adjustments are made by adjusting individual slider controls for each segmented region 210. In FIG. 8, five individual slider controls 802-810 are shown that corresponding to five segmented regions 210A-E (as shown in FIGS. 4 and 5). The five indicia 222A-E correspond to the five segmented regions 210A-E (as shown in FIGS. 4 and 5). As noted above, any number of segmented regions 210 and any number of corresponding slider controls may be provided.

Figure 6:
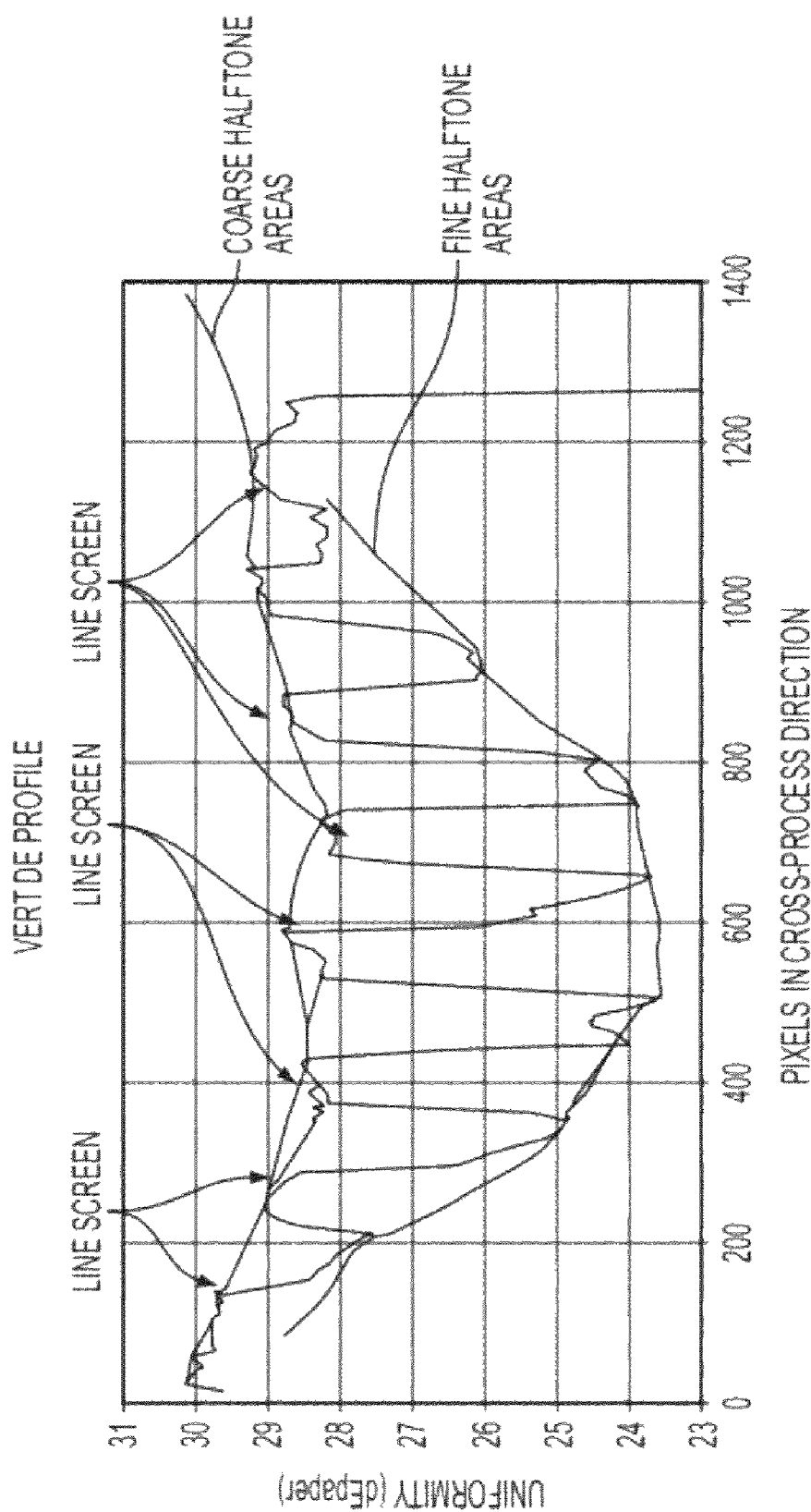
FIG. 6 illustrates a graphical representation of the uniformity profile of the exemplary test pattern shown in FIG. 3 in accordance with an embodiment.

FIG. 6 illustrates a delta-E or uniformity profile (from paper) of the test pattern 208 shown in FIG. 3. The graph in FIG. 6 illustrates the pixels in the cross-process direction on a horizontal x-axis. On a vertical y-axis, the bar graphs illustrate Delta-E values. Generally, delta-E (dE) is a number that represents the distance between two colors.

The graph in FIG. 6 illustrates the stable coarser halftone areas 214 having a roughly uniform density profile across the page and the very different density profile for the fine halftone areas 216. As shown in FIG. 6, the density of the coarse halftone areas 214 is ranging from 28 to 29 delta-E units and is generally uniform. In contrast, the density of the fine halftone areas 216 is ranging from 24 to 28 delta-E units. That is, while the coarse halftone areas 214 show a variability of less than 2 delta-E units, the fine halftone areas 216 show a variability (i.e., from peak to peak) of around 7 delta-E units. The coarser halftone areas 214 may generally include a "shallow" u-shaped density profile versus a "deep" u-shaped density profile of the fine halftone areas 216. Therefore, the graph in FIG. 6 shows that the fine halftone areas 216 are more sensitive (i.e., in comparison with the coarser halftone areas 214) to the non-uniformities in the xerographic set points in the image printing system. In general, the non-uniformities in the image printing system 100 may include, for example, non-uniformity caused by mixing of the material, non-uniformity caused by a bow in the roller, charge non-uniformity, and the image bearing surface (i.e., photoreceptor) non-uniformity. Even though a u-shaped density profile is shown in the illustrated embodiment in FIG. 6, other shaped density profiles such as a sinusoidal density profile (e.g., in case of a banding non-uniformity) may be possible. Both the coarse halftone area density profile and the fine halftone area density profile will become more flat as the laser power profile is adjusted for improved uniformity.

Figure 7:
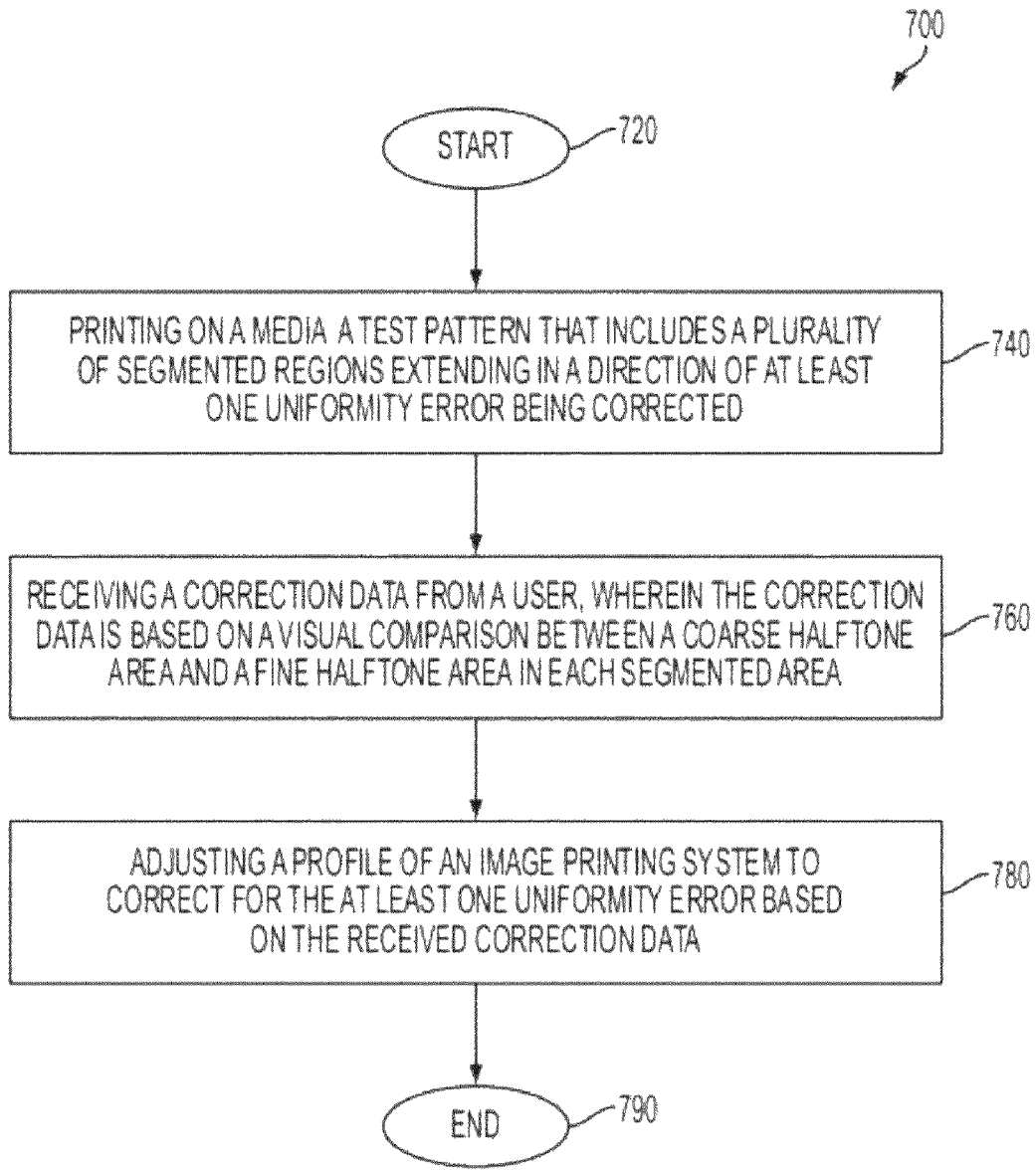
FIG. 7 illustrates a method for correcting at least one uniformity error selected from the group consisting of a process direction uniformity error and a cross-process direction uniformity error in the image printing system in accordance with an embodiment.

FIG. 7 illustrates a method 700 for correcting at least one uniformity error selected from the group consisting of a process direction uniformity error and a cross-process direction uniformity error in the image printing system 100 in accordance with an embodiment of the present disclosure. The method 700 begins at procedure 720. At procedure 740, the print engine 202 is configured to print on the media 206 the test pattern 208 comprising a plurality of segmented regions 210 extending in the direction of the at least one uniformity error being corrected. Each segmented region 210 corresponding to a position on the image bearing surface of the image printing system 100. As shown in FIGS. 2, 3, and 4, each segmented region 210 includes the coarse halftone area 214 and a fine halftone area 216 adjacent one another, wherein the resolution of the fine halftone area 216 is about 1.5 to 2 times the resolution of the coarse halftone area 214.

Next, at procedure 760, the controller 204 is configured to receive the correction data from the user 220. The correction data is input by the user 220 as discussed above, based on his/her visual comparison between the coarse halftone area 214 and the fine halftone area 216 in each segmented area 210. Next, at procedure 780, the controller 204 is configured to adjust a profile of the image printing system 100 to correct for the at least one uniformity error based on the received correction data. Finally, the method 700 ends at procedure 790.

The controller may be provided to control the various elements and sequence of operations of the image printing system 100 (as shown in FIG. 1) in accordance with the various embodiments disclosed herein. In some implementations, the controller may be dedicated hardware like ASICs or FPGAs, software (firmware), or a combination of dedicated hardware and software. For the different applications of the embodiments disclosed herein, the programming and/or configuration may vary. In one embodiment, the controller may be a digital front end (DFE) associated with the printer.

The term "media," as used herein, may include a sheet of paper, such as a standard 8½×11 inch letter paper, A4 paper, or 8½×14 inch legal paper. However, it will be appreciated that "media" may include other sizes and printable media types, such as, bond paper, parchment, cloth, cardboard, plastic, transparencies, film, foil, or other print media substrates. Any reference to paper is not to be construed as limiting. Different grade and/or gloss media may be used.

The term "image printing system" as used herein encompasses any device, such as a copier, bookmaking machine, facsimile machine, or a multi-function machine. In addition, the word "image printing system" may include ink jet, laser or other pure printers, which performs a print outputting function for any purpose.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for correcting at least one uniformity error selected from the group consisting of a process direction uniformity error and a cross-process direction uniformity error in an image printing system that prints on an image bearing surface movable in a process direction, the method comprising:

printing on a media a test pattern comprising a plurality of segmented regions extending in the direction of the at least one uniformity error being corrected, each segmented region corresponding to an adjustment position of the image printing system, and each segmented region comprising a coarse halftone area and a fine halftone area adjacent one another, wherein the resolution of the fine halftone area is at least about 1.5 times the resolution of the coarse halftone area;

receiving correction data from the user, wherein the correction data is based on a visual comparison between the coarse halftone area and the fine halftone area in each segmented area; and adjusting a profile of the image printing system to correct for the at least one uniformity error based on the received correction data.

2. The method according to claim 1, wherein the resolution of the fine halftone area is between about 1.5 and about 2 times the resolution of the coarse halftone area.

3. The method according to claim 1, wherein the coarse halftone area comprises line screens.

4. The method according to claim 3, wherein the line screens comprising vertical line screens, horizontal line screens, or both.

5. The method according to claim 1, wherein the plurality of the segmented regions is placed periodically on the test pattern.

6. The method according to claim 1, wherein the test pattern comprises 8 to 16 segmented regions.

7. The method according to claim 1, wherein the profile comprises a laser power profile of a raster output scanner.

8. The method according to claim 1, wherein the test pattern include indicia corresponding to the segmented regions.

9. The method according to claim 8, further comprising providing a user interface for receiving the correction data from the user.

10. The method according to claim 9, wherein the user interface comprises a graphical user interface.

11. The method according to claim 10, wherein the graphical user interface is configured to receive the correction data corresponding to each of the indicia.

12. The method according to claim 11, wherein the graphical user interface includes an equalizer having a control for each of the segmented regions.

13. The method according to claim 1, wherein the test pattern comprises about 0.5 to about 1 segmented regions per inch of process width or length.

14. The method according to claim 1, wherein the segmented regions have a width of about 1 to about 2 inches.

15. A system for correcting at least one uniformity error selected from the group consisting of a process direction uniformity error and a cross-process direction uniformity error in an image printing system that prints on an image bearing surface movable in a process direction, the system comprising:

a print engine configured to print on a media a test pattern comprising a plurality of segmented regions extending in the direction of the at least one uniformity error being corrected, each segmented region corresponding to an adjustment position of the image printing system, and each segmented region comprising a coarse halftone area and a fine halftone area adjacent one another, wherein the resolution of the fine halftone area is at least about 1.5 times the resolution of the coarse halftone area; and a controller configured
      (a) to receive correction data from the user, wherein the correction data is based on a visual comparison between the coarse halftone area and the fine halftone area in each segmented area; and
      (b) to adjust a profile of the image printing system to correct for the at least one uniformity error based on the received correction data.

16. The system according to claim 15, wherein the resolution of the fine halftone area is between about 1.5 and about 2 times the resolution of the coarse halftone area.

17. The system according to claim 15, wherein the coarse halftone area comprises line screens.

18. The system according to claim 17, wherein the line screens comprising vertical line screens, horizontal line screens, or both.

19. The system according to claim 15, wherein the plurality of the segmented regions is placed periodically on the test pattern.

20. The system according to claim 15, wherein the test pattern comprises 8 to 16 segmented regions.

21. The system according to claim 15, wherein the profile comprises a laser power profile of a raster output scanner.

22. The system according to claim 15, wherein the test pattern include indicia corresponding to the segmented regions.

23. The system according to claim 22, further comprising a user interface for receiving the correction data from the user.

24. The system according to claim 23, wherein the user interface comprises a graphical user interface.

25. The system according to claim 24, wherein the graphical user interface is configured to receive the correction data corresponding to each of the indicia.

26. The system according to claim 25, wherein the graphical user interface includes an equalizer having a control for each of the segmented regions.

* * * * *